United States Patent
Song et al.

(10) Patent No.: US 12,266,764 B2
(45) Date of Patent: Apr. 1, 2025

(54) METHOD OF MANUFACTURING COMPOSITE ANODE FOR LITHIUM ION BATTERY

(71) Applicants: Hyundai Motor Company, Seoul (KR); Kia Corporation, Seoul (KR); Ulsan National Institute of Science and Technology, Ulsan (KR)

(72) Inventors: Jong Chan Song, Gyeonggi-do (KR); Won Keun Kim, Seoul (KR); Jae Wook Shin, Seoul (KR); Sung Hee Shin, Incheon (KR); Kyoung Han Ryu, Gyeonggi-do (KR); Seong Min Ha, Seoul (KR); Seok Ju Kang, Ulsan (KR); Kyung Eun Baek, Ulsan (KR)

(73) Assignees: Hyundai Motor Company, Seoul (KR); Kia Corporation, Seoul (KR); Ulsan National Institute of Science and Technology, Ulsan (KR)

( * ) Notice: Subject to any disclaimer, the term of this patent is extended or adjusted under 35 U.S.C. 154(b) by 336 days.

(21) Appl. No.: 17/480,241

(22) Filed: Sep. 21, 2021

(65) Prior Publication Data
US 2022/0294004 A1  Sep. 15, 2022

(30) Foreign Application Priority Data
Mar. 11, 2021  (KR) ........................ 10-2021-0031741

(51) Int. Cl.
| | | |
|---|---|---|
| *H01M 10/05* | (2010.01) | |
| *H01M 4/04* | (2006.01) | |
| *H01M 4/133* | (2010.01) | |
| *H01M 4/1393* | (2010.01) | |
| *H01M 10/0525* | (2010.01) | |
| *H01M 10/058* | (2010.01) | |

(52) U.S. Cl.
CPC ....... *H01M 10/058* (2013.01); *H01M 4/0416* (2013.01); *H01M 4/0471* (2013.01); *H01M 4/133* (2013.01); *H01M 4/1393* (2013.01); *H01M 10/0525* (2013.01)

(58) Field of Classification Search
CPC ............. H01M 4/0416; H01M 4/0471; H01M 4/0404; H01M 4/0438; H01M 4/133; H01M 4/1393; H01M 10/058; H01M 10/0525; H01M 10/052
See application file for complete search history.

(56) References Cited

U.S. PATENT DOCUMENTS

| | | | | |
|---|---|---|---|---|
| 2012/0025147 A1* | 2/2012 | Zhang | ..................... | H01M 4/40 422/112 |
| 2020/0227730 A1* | 7/2020 | Zhamu | .............. | H01M 10/0525 |

FOREIGN PATENT DOCUMENTS

| | | | | | |
|---|---|---|---|---|---|
| CN | 105810951 | * | 7/2016 | ............. | H01M 4/86 |
| KR | 101597570 B1 | | 2/2016 | | |
| WO | 2015/085278 A1 | | 6/2015 | | |
| WO | WO 2018/045226 | * | 3/2018 | ............. | H01M 2/16 |

* cited by examiner

*Primary Examiner* — Raymond Alejandro
(74) *Attorney, Agent, or Firm* — Fox Rothschild LLP (57) ABSTRACT

A method of manufacturing a composite anode for a lithium ion battery and a composite anode for a lithium ion battery manufactured thereby. According to the method provide herein, since a metal catalyst precursor is reduced using Joule heating to obtain a carbon-metal catalyst composite layer, composite anode for a lithium ion battery having a large area in a short period of time can be provided, which is excellent in terms of economic feasibility. Further, since it is possible to manufacture a composite anode for a lithium ion battery with the improved lithium electrodeposition density and reversibility of lithium ions, a composite anode for a lithium ion battery having high capacity and improved life stability can be obtained.

7 Claims, 5 Drawing Sheets

METHOD OF MANUFACTURING COMPOSITE ANODE FOR LITHIUM ION BATTERY

CROSS REFERENCE TO RELATED APPLICATION

The present application claims priority based on Korean Patent Application No. 10-2021-0031741, filed on Mar. 11, 2021, the entire content of which is incorporated herein for all purposes by this reference.

TECHNICAL FIELD

The present invention relates to a method of manufacturing a composite anode for a lithium ion battery, and a composite anode for a lithium ion battery manufactured using the same.

BACKGROUND

As the demand for electric vehicles and large-capacity power storage devices increases, various batteries have been developed to meet the demand. Lithium secondary batteries have the best energy density and output characteristics among various secondary batteries and thus have been widely commercialized. As the lithium secondary battery, a lithium secondary battery containing a liquid-type electrolyte containing an organic solvent (hereinafter referred to as a 'liquid-type secondary battery') has been mainly used.

However, in the case of the liquid-type secondary battery, a liquid electrolyte is decomposed due to an electrode reaction, causing the battery to expand, and the risk of ignition due to leakage of the liquid electrolyte has been pointed out. In order to overcome the problems of such a liquid-type secondary battery, a lithium ion secondary battery to which a solid electrolyte having excellent stability is applied (hereinafter referred to as a 'lithium ion battery') is attracting attention.

Meanwhile, the anode used in the lithium ion battery has a problem in that the reversibility and life of the battery are reduced due to the growth of lithium dendrites and changes in the volume of the anode during a charging and discharging process. Accordingly, various studies on the anode unit structure of lithium ion batteries have recently been conducted, and efforts have been made to reduce the ratio of change in anode volume expansion. However, there still remains a problem in that the energy density is reduced due to low electrodeposition density when driving with high capacity, causing a phenomenon of shortening the life of the lithium metal secondary battery.

SUMMARY

In preferred aspects, provided is a method of manufacturing a composite anode for a lithium ion battery. The method may include adding a metal catalyst precursor solution to a carbon-modified layer obtained by modifying the surface of a carbon-supplying layer under a specific condition, performing Joule heating under a specific condition to obtain a carbon-metal catalyst composite layer, and impregnating lithium metal on one surface of the carbon-metal catalyst composite layer to form an impregnation layer having a predetermined thickness.

The objectives of the present invention are not limited to the foregoing, and will be able to be clearly understood through the following description and to be realized by the means described in the claims and combinations thereof.

In an aspect, provided is a method of manufacturing a composite anode for a lithium ion battery. The method may include form a carbon-modified layer by first heat treating a carbon-supplying layer so that a surface of the carbon-supplying layer is modified, adding a metal catalyst precursor solution to the carbon-modified layer, forming a carbon-metal catalyst composite layer by second heating the carbon-modified layer to which the metal catalyst precursor solution is added, and forming an impregnation layer having a predetermined thickness by impregnating lithium metal on one surface of the carbon-metal catalyst composite layer.

In one aspect, a method of manufacturing a composite anode for a lithium ion battery is provided comprising: (a) forming a carbon-modified layer first by heat treating a carbon-supplying layer so that a surface of the carbon-supplying layer is modified; (b) adding a metal catalyst precursor solution to the carbon-modified layer; (c) forming a carbon-metal catalyst composite layer by second heating the carbon-modified layer; to which the metal catalyst precursor solution is added; and (d) forming an impregnation layerness by impregnating lithium metal on one surface of the carbon-metal catalyst composite layer. In an aspect, provided is a composite anode for a lithium ion battery may include a carbon-metal catalyst composite layer in which a metal catalyst is carried in a carbon-modified layer, and an impregnation layer, which has a predetermined thickness and which is impregnated with lithium metal, on one surface of the carbon-metal catalyst composite layer.

The carbon-supplying layer may suitably include carbon paper, carbon cloth, carbon felt, and mixture thereof.

The first heat treating may be performed at a temperature of about 400 to 500° C. for about 4 to 6 hours to achieve surface modification.

The metal catalyst precursor solution may suitably include one or more selected from the group consisting of silver nitrate ($AgNO_3$), platinum chloride ($PtCl_2$), iron chloride ($FeCl_3$), palladium chloride ($PdCl_2$), ruthenium chloride ($RuCl_2$), nickel chloride ($NiCl_2$), and copper chloride ($CuCl_2$). The second heating may be performed on the carbon-modified layer, to which the metal catalyst precursor solution is added, in an inert gas atmosphere at a current of about 25 A to 35 A for about 1 to 5 seconds.

The carbon-metal catalyst composite layer may include an amount of about 85 to 95 wt % of the carbon-modified layer and an amount of about 5 to 15 wt % of the metal catalyst based on 100 wt % of the carbon-metal catalyst composite layer.

The impregnation layer may have a thickness of about 100 to 200 um.

In an aspect, provided is a lithium ion battery includes the composite anode for the lithium ion battery, an electrolyte membrane located on the composite anode for the lithium ion battery, and a cathode located on the electrolyte membrane.

An impregnation layer may be located in the composite anode for the lithium ion battery so as to come into contact with the electrolyte membrane.

According to various exemplary embodiments of the present invention, since a metal catalyst precursor is reduced using Joule heating to obtain a carbon-metal catalyst composite layer, it is possible to manufacture a composite anode for a lithium ion battery having a large area in a short period of time, which is excellent in terms of economic feasibility.

Further, according to various exemplary embodiments of the present invention, since it is possible to manufacture a composite anode for a lithium ion battery with the improved lithium electrodeposition density and reversibility of lithium ions, a composite anode for a lithium ion battery having high capacity and improved life stability is obtained.

The effects of the present invention are not limited to the foregoing, and should be understood to include all effects that can be reasonably anticipated from the following description.

Other aspects of the invention are disclosed infra.

DETAILED DESCRIPTION

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

In the related art, an anode used in a conventional lithium ion battery has a problem in that the reversibility and life of the battery are reduced due to the growth of lithium dendrites and changes in the volume of the anode during a charging and discharging process.

Provided herein, inter alia, are methods of manufacturing a composite anode for a lithium ion battery having a large area in a short period of time and a composite anode for a lithium ion battery with improved lithium electrodeposition density and reversibility of lithium ions when a composite anode for a lithium ion battery is manufactured by adding a metal catalyst precursor solution to a carbon-modified layer obtained by modifying the surface of a carbon-supplying layer under a specific condition, performing Joule heating under a specific condition to obtain a carbon-metal catalyst composite layer, and impregnating lithium metal on one surface of the carbon-metal catalyst composite layer to form an impregnation layer having a predetermined thickness. As such, a composite anode for a lithium ion battery having high capacity and improved life stability may be obtained.

Figure 1:
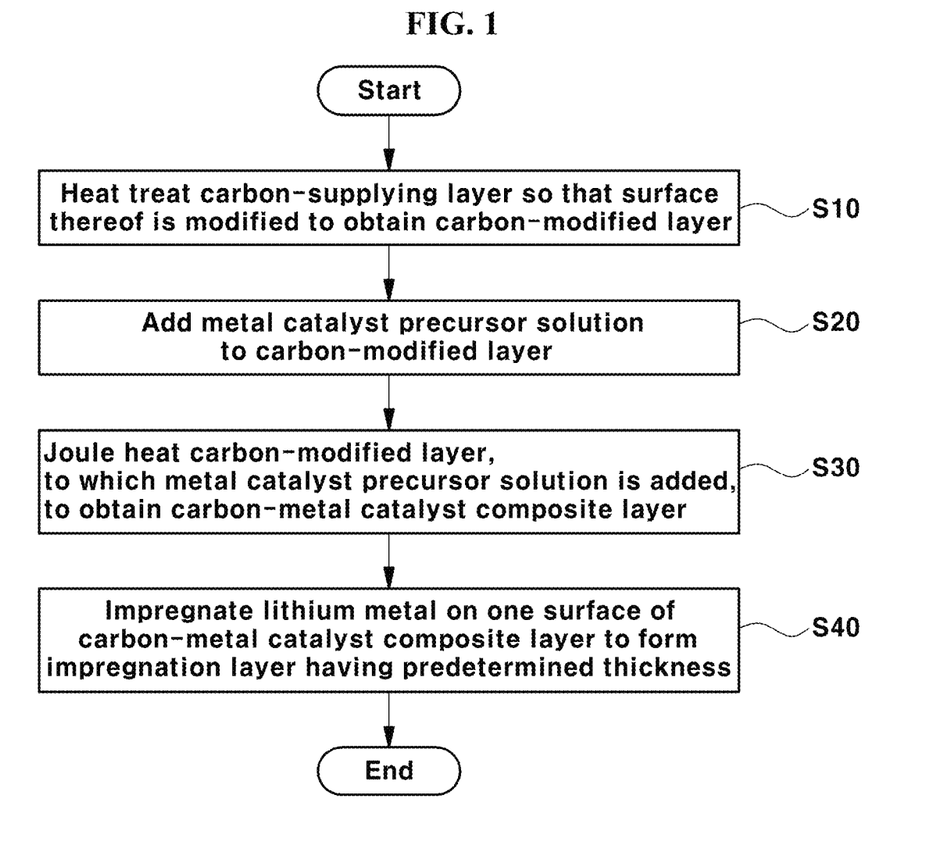
FIG. 1 shows an exemplary method of manufacturing a composite anode for a lithium ion battery according to an exemplary embodiment of the present invention.

FIG. 1 is a flowchart schematically showing an exemplary method of manufacturing an exemplary composite anode for a lithium ion battery according to an exemplary embodiment of the present invention. For example, the method may include steps: forming a carbon-modified layer by first heat treating a carbon-supplying layer so that a surface of the carbon-supplying layer is modified (S10), adding a metal catalyst precursor solution to the carbon-modified layer (S20), forming a carbon-metal catalyst composite layer by second heating the carbon-modified layer to which the metal catalyst precursor solution is added (S30), and impregnating lithium metal on one surface of the carbon-metal catalyst composite layer to form an impregnation layer having a predetermined thickness (S40).

The step of obtaining the carbon-modified layer at step S10 may include preparing the carbon-supplying layer, followed by the first heat treatment, thus obtaining the carbon-modified layer having a modified surface.

The carbon-supplying layer may include a typical layer containing carbon material, for example, carbon paper, carbon cloth, carbon felt, or a mixture thereof. However, the carbon-supplying layer is not limited to containing only a specific supply source.

The prepared carbon-supplying layer may be heat treated to obtain the carbon-modified layer having the modified surface. For the carbon-modified layer, the element content of the surface functional group included in the carbon-supplying layer may be adjusted and the specific surface area thereof may be further increased, which makes it easier to perform lithium metal impregnation later.

The heat treatment for obtaining the carbon-modified layer may be performed at a temperature of about 400 to 500° C. for about 4 to 6 hours to modify the surface of the carbon-modified layer. When the heat treatment temperature is less than about 400° C., the surface functional group may not clearly change. When the heat treatment temperature is greater than about 500° C., the weight of the carbon-modified layer may be significantly reduced.

The element of the surface functional group that may be included in the carbon-supplying layer may include one or more selected from the group consisting of carbon (C), oxygen (O), nitrogen (N), and fluorine (F). However, the surface functional group is not limited to containing only a specific element.

For the surface functional group of the carbon-supplying layer, the element content of the surface functional group may be changed through the heat treatment for obtaining the carbon-modified layer, thus changing an element content ratio. For example, the surface functional group of the carbon-supplying layer may include an amount of about 90 to 99 wt % of carbon (C), an amount of about 0.1 to 5 wt % of oxygen (O), an amount of about 0.1 to 5 wt % of nitrogen (N), and an amount of about 0.1 to 5 wt % of fluorine (F) based on 100 wt % of the total weight of the surface functional group of the carbon-supplying layer, so the surface functional group of the carbon-supplying layer may be changed through the heat treatment. Preferably, the surface functional group of the carbon-modified layer may be changed through the heat treatment such that the surface functional group of the carbon-modified layer may include an amount of about 80 to 89 wt % of carbon (C), an amount of about 5 to 15 wt % of oxygen (O), an amount of about 0.1 to 5 wt % of nitrogen (N), and an amount of about 0.1 to 5 wt % of fluorine (F) based on 100 wt % of the total weight of the surface functional group of the carbon-modified layer.

Further, the specific surface area of the carbon-supplying layer may be changed through the first heat treatment. Preferably, the specific surface area of the carbon-supplying layer may be about 5 to 15 $m^2/g$, and through the heat treatment, the specific surface area of the carbon-modified layer may be changed to about 175 to 195 $m^2/g$.

That is, according to the present invention, the carbon-supplying layer is heat treated under a specific heat treatment condition to obtain a carbon-modified layer having an increased content of the oxygen (O) element in the surface functional group and an increased specific surface area. Thereby, a lithium metal to obtain a composite anode for a lithium ion battery later may be more easily and efficiently impregnated, thus forming an impregnation layer.

The step of adding the precursor solution at step S20 may include adding a metal catalyst precursor solution to the carbon-modified layer obtained through the heat treatment, thus forming a carbon-metal catalyst composite layer.

The added metal catalyst precursor solution may include a precursor solution containing a precursor of a metal catalyst that may be doped into the carbon-modified layer. The metal catalyst may be doped in the carbon-modified layer so that lithium metal is more easily adsorbed on the metal catalyst compared to carbon, which facilitates the impregnation of the lithium metal. For example, the precursor solution may include one or more selected from the group consisting of silver nitrate ($AgNO_3$), platinum chloride ($PtCl_2$), iron chloride ($FeCl_3$), palladium chloride ($PdCl_2$), ruthenium chloride ($RuCl_2$), nickel chloride ($NiCl_2$), and copper chloride ($CuCl_2$), but is not limited to containing only a specific precursor. Preferably, silver nitrate ($AgNO_3$) may be included as a silver (Ag) precursor having a very low nucleation overpotential with the lithium metal.

The step of obtaining the carbon-metal catalyst composite layer at step S30 may include Joule heating (or "second hearing") the carbon-modified layer, to which the metal catalyst precursor solution is added, to finally reduce the metal catalyst precursor into the metal catalyst, thus forming the carbon-metal catalyst composite layer.

The method may further include drying the carbon-modified layer to which the metal catalyst precursor solution is added before the Joule heating is performed. Preferably, the carbon-modified layer to which the metal catalyst precursor solution is added may be dried at a temperature of about 50 to 70° C. under a condition of about 10 to 14 hours or more. When a drying time is less than about 10 hours, a solvent may remain as a residue and thus Joule heating is not properly performed later. The carbon-modified layer, to which the metal catalyst precursor solution is added, may be dried to completely vaporize the solvent so that only the metal catalyst precursor remains in the carbon-modified layer.

In the Joule heating method, the metal catalyst, which is generated by transferring Joule heat to the carbon-modified layer to thus reduce the metal catalyst precursor, may be doped onto the carbon-modified layer. Since the carbon-metal catalyst composite layer is obtained in a short period of time through the Joule heating method, it is possible to manufacture a composite anode for a lithium ion battery having a large area in a short period of time, which is excellent in terms of economic feasibility.

The Joule heating method may include disposing a first electrode and a second electrode spaced apart from each other on the carbon-modified layer, applying a current between the first electrode and the second electrode, and Joule heating the carbon-modified layer.

The first electrode and the second electrode may include the same material, for example, one or more selected from the group consisting of Ag, Cu, Au, Al, and Be, and the first electrode and the second electrode may not include only a specific component.

The first electrode and the second electrode that are disposed as described above may be spaced apart from each other so as to face each other, making a current flow uniform inside the carbon-modified layer. Joule heat in the carbon-modified layer may be uniformly generated according to the uniform current flow. As a result, the metal catalyst may be uniformly doped on the carbon-modified layer.

The current may be applied to the first electrode and the second electrode at about 25 A to 35 A.

Preferably, the current may be applied for about 1 to 5 seconds in an inert gas atmosphere, specifically, an argon (Ar) gas atmosphere, so that the carbon-modified layer may be Joule heated, thereby finally doping the metal catalyst. When the current is less than about 25 A, since the temperature is not increased to a specific high temperature, the metal catalyst precursor may not be reduced. Further, when a current application time is less than about 1 second, the size of the reduced metal catalyst nanoparticles may be very small. When the current application time is greater than about 35 A, the size of the reduced metal catalyst nanoparticles may be excessively increased.

The carbon-metal catalyst composite layer obtained through the Joule heating method may include an amount of about 85 to 9) 5 wt % of the carbon-modified layer and an amount of about 5 to 15 wt % of the metal catalyst based on 100 wt % of the carbon-metal catalyst composite layer. When the content of the metal catalyst is less than about 5 wt %, the metal catalyst effect may not occur. When the content of the metal catalyst is greater than about 15 wt %, the metal catalyst may cover the entire carbon-modified layer.

The step of forming the impregnation layer at step S40 may include impregnating lithium metal on one surface of the carbon-metal catalyst composite layer to form an impregnation layer having a predetermined thickness.

Preferably, the lithium metal may be melted at a temperature of about 350 to 450° C., and then impregnated on one surface of both surfaces of the carbon-metal catalyst composite layer for about 5 to 10 seconds, thus forming an impregnation layer having a predetermined thickness. When the melting temperature is very low outside the above range, impregnation does not work well. Further, when an impregnation time is less than about 5 seconds, lithium may not be uniformly impregnated. When the impregnation time is greater than about 10 seconds, the amount of lithium impregnated may be excessively increased.

A part of the predetermined thickness of the impregnation layer may include a layer in which lithium metal is impregnated in the carbon-metal catalyst composite layer, and the rest may include a layer in which the lithium metal is not impregnated in the carbon-metal catalyst composite layer.

The thickness of the formed impregnation layer may be about 100 to 200 μm. When the thickness of the impregnation layer is less than about 100 μm, the capacity of the carried lithium may be reduced, making it difficult to drive cells. When the thickness thereof is greater than about 200 μm, the effect of lithium carrying may be insufficient because the thickness of the carbon-modified layer may be excessively large.

A composite anode for a lithium ion battery manufactured by the methods described herein may include a carbon-metal catalyst composite layer in which a metal catalyst is carried in a carbon-modified layer, and an impregnation layer, which has a predetermined thickness and which is impregnated with lithium metal, on one surface of the carbon-metal catalyst composite layer. The carbon-metal catalyst composite layer and the impregnation layer may be the same as those described in the manufacturing method.

Further, a lithium ion battery may include the composite anode for the lithium ion battery, an electrolyte membrane located on the composite anode for the lithium ion battery, and a cathode located on the electrolyte membrane. The composite anode for the lithium ion battery may be the same as those described in the above manufacturing method and the above composite anode for the lithium ion battery. Further, as the electrolyte membrane and the cathode, a typical electrolyte membrane and cathode that are capable of being used according to various exemplary embodiments of the present invention may be used, and the electrolyte membrane and the cathode are not limited to containing only a specific component.

Particularly, in the method of manufacturing the composite anode for the lithium ion battery as described above, since it is possible to manufacture a composite anode for a lithium ion battery with the improved lithium electrodeposition density and reversibility of lithium ions, a composite anode for a lithium ion battery having high capacity and improved life stability may be obtained.

EXAMPLE

The present invention will be described in more detail through the following Examples. The following Examples are only examples to aid understanding of the present invention, and the scope of the present invention is not limited thereto.

Preparation Example: Manufacture of Carbon-Modified Layer (S10) Carbon paper (HCP 010N) was prepared as a carbon-supplying layer, and the carbon paper was heat treated in a general atmospheric environment at a temperature of 500° C. for 4 hours using a furnace to be modified at a surface of the carbon-supplying layer. Finally, a carbon-modified layer having a modified surface was obtained.

Example 1: Manufacture of Composite Anode for Lithium Ion Battery (S20, S30) 10 mg/mL of a $AgNO_3$ aqueous solution was prepared as a metal catalyst precursor solution at step S20. Next, the carbon-modified layer having the modified surface manufactured in the Preparation Example was soaked in the metal catalyst precursor solution and then dried in an oven at a temperature of 60° C. for 12 hours or more. Next, the dried carbon-modified layer was cut so as to have a size of 3×4 cm and subjected to Joule heating for 1 s in a glove box in an argon (Ar) atmosphere under a current condition of 25A, thus reducing $AgCl_2$, which was the metal catalyst precursor, into Ag which was the metal catalyst. Accordingly, Ag nanoparticles were formed (doped) on the carbon-modified layer, thus obtaining a carbon-metal catalyst composite layer.

(S40) The obtained carbon-metal catalyst composite layer was impregnated in the lithium metal melted at a temperature of 450° C. for about 5 to 10 seconds and then hardened at room temperature, thus finally manufacturing a composite anode for a lithium ion battery including an impregnation layer.

Example 2: Manufacture of Lithium Ion Battery Using Composite Anode for Lithium Ion Battery The composite anode for the lithium ion battery according to Example 1 was prepared as an anode.

A Celgard 2400 separation membrane was prepared as an electrolyte membrane and was located on an impregnation layer in the composite anode for the lithium ion battery.

An NCM cathode including nickel, cobalt, and manganese at a ratio of 8:1:1 was prepared as a cathode and was located on the electrolyte membrane, thus finally manufacturing a lithium ion battery.

Examples 3-1 and 3-2: Manufacture of Symmetric Cell Using Composite Anode for Lithium Ion Battery A Celgard 2400 separation membrane was prepared as an electrolyte membrane. Next, the composite anode for the lithium ion battery according to Example 1 was located on both sides of the electrolyte membrane, thus manufacturing a symmetric cell.

Specifically, a symmetric cell in which an impregnation layer was located in the composite anode for the lithium ion battery so as to come into contact with the electrolyte membrane (Example 3-1), and a symmetric cell in which a carbon-metal catalyst composite layer was located in the composite anode for the lithium ion battery so as to come into contact with the electrolyte membrane (Example 3-2) were individually manufactured.

Comparative Example 1: Manufacture of Anode for Lithium Ion Battery

For the comparison with Example 1, an anode for a lithium ion battery was manufactured in the same manner as in Example 1, except that steps S20 and S30 were omitted and the carbon-modified layer having the modified surface manufactured in the Preparation Example was directly impregnated with lithium metal at step S40.

Comparative Example 2: Manufacture of Lithium Ion Battery

For the comparison with Example 2, a lithium ion battery was manufactured in the same manner as in Example 2, except that the anode for the lithium ion battery according to Comparative Example 1 was used as an anode instead of the composite anode for the lithium ion battery according to Example 1.

Comparative Examples 3-1 and 3-2: Manufacture of Symmetric Cell Using Anode for Lithium Ion Battery For the comparison with Example 3-1, a symmetric cell was manufactured in the same manner as in Example 3-1, except that the anode for the lithium ion battery according to Comparative Example 1 (Comparative Example 3-1) or the lithium anode having a thickness of 300 μm, which was a conventional anode (purchased from FMC), (Comparative Example 3-2) was located instead of the composite anode for the lithium ion battery according to Example 1 on both sides of the electrolyte membrane to manufacture the symmetric cell.

Experimental Example 1: Analysis of Surface Functional Group of Carbon-Modified Layer The surface functional group of the carbon-supplying layer prepared before the carbon-modified layer, which was the Preparation Example, was manufactured and the surface functional group of the carbon-modified layer having the surface modified using heat treatment were analyzed, and the results are shown in Table 1 below.

TABLE 1

| Carbon-supplying layer | | Carbon-modified layer | |
|---|---|---|---|
| Surface functional group (wt %) | Specific surface area (m²/g) | Surface functional group (wt %) | Specific surface area (m²/g) |
| C 96.3% O 2.2% N 1.0% F 0.5% | 10.0 | C 88.1% O 11.1% N 0.4% F 0.3% | 184.1 |

As shown in the above table, in the case of the carbon-modified layer having the surface modified by performing heat treatment under the heat treatment condition according to the exemplary embodiment of the present invention, the oxygen (O) ratio of the surface functional group was increased by approximately 10% from 2.2% to 11.1%, and the specific surface area thereof was increased by about 170 m²/g. Accordingly, the lithium metal is capable of being easily impregnated later.

Experimental Example 2: Analysis of Volume Expansion Ratio and Overvoltage of Composite Anode for Lithium Ion Battery After the composite anode for the lithium ion battery manufactured according to Example 1 and the anode for the lithium ion battery manufactured according to Comparative Example 1 were prepared, the loading amount and thickness of lithium metal were measured, and the results are shown in Table 2 below.

TABLE 2

| Comparative Example 1 | | Example 1 | |
|---|---|---|---|
| Lithium loading (mg) | Thickness (um) | Lithium loading (mg) | Thickness (um) |
| 8 | 176 | 5 | 117 |

Figure 2A:
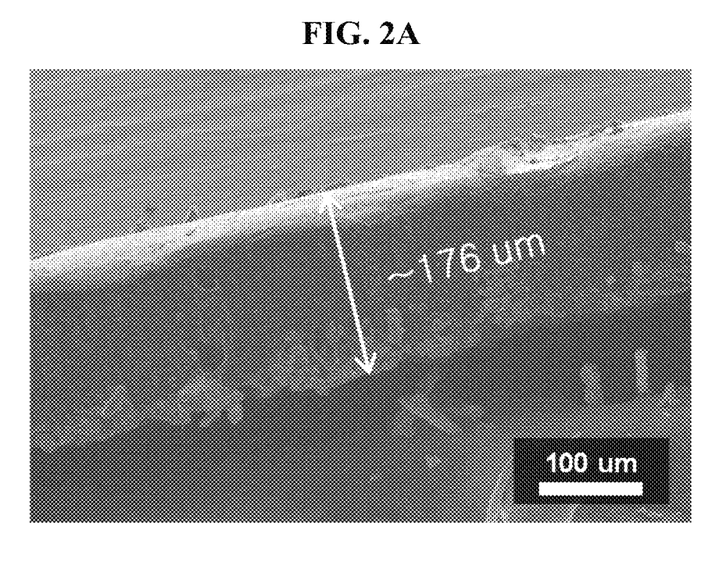
FIG. 2A shows an SEM image showing an anode for a lithium ion battery according to Comparative Example 1 before thirty cycles of charging and discharging together with a thickness thereof.
Figure 2B:
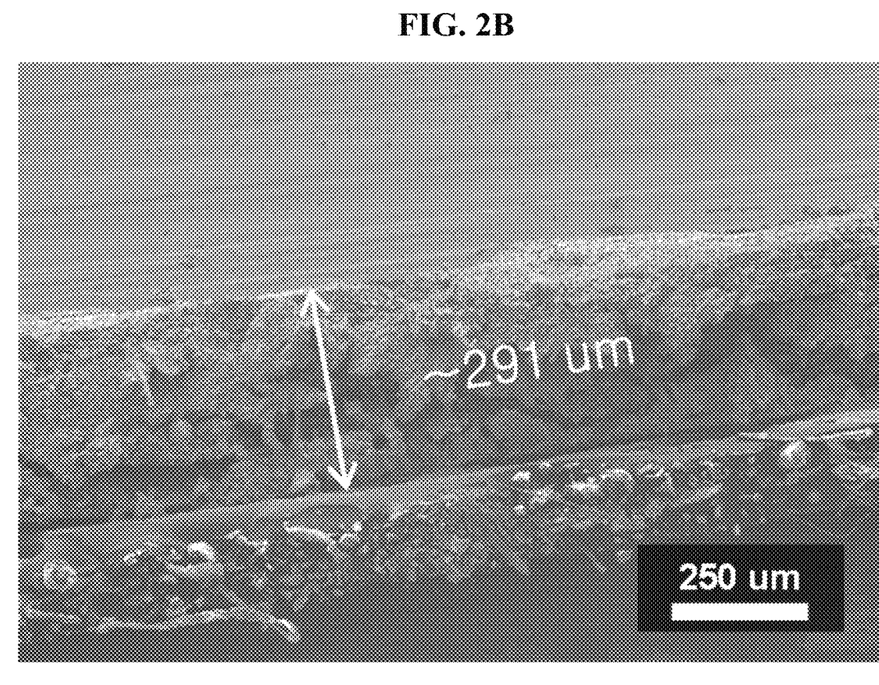
FIG. 2B shows an SEM image showing the anode for the lithium ion battery according to Comparative Example 1 after thirty cycles of charging and discharging together with a thickness thereof.
Figure 3A:
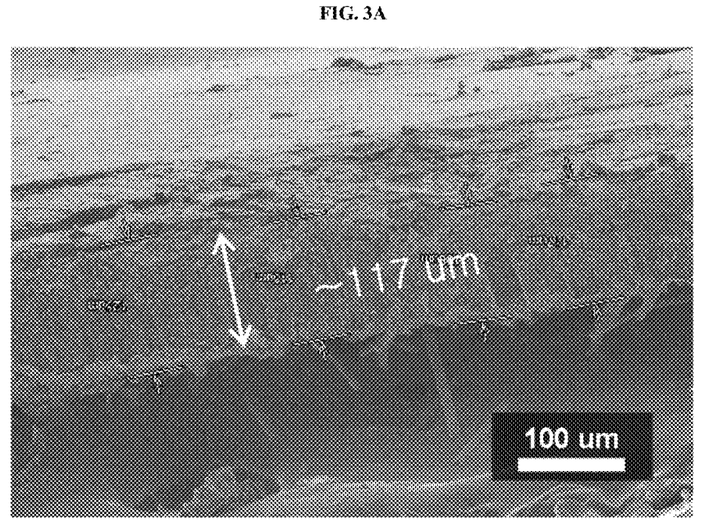
FIG. 3A shows an SEM image showing an exemplary composite anode for a lithium ion battery according to Example 1 before thirty cycles of charging and discharging together with a thickness thereof.
Figure 3B:
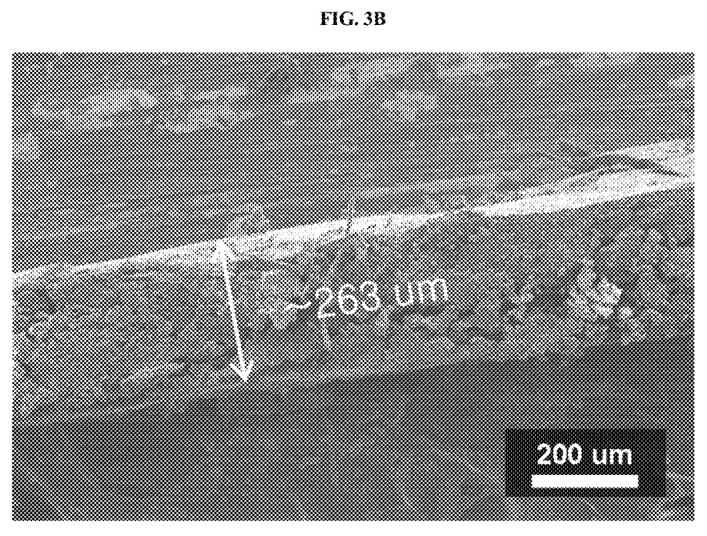
FIG. 3B shows an SEM image showing an exemplary lithium ion battery according to Example 1 after thirty cycles of charging and discharging together with a thickness thereof.

Further, the lithium ion battery (Example 2) was manufactured using the composite anode for the lithium ion battery according to Example 1, and the lithium ion battery (Comparative Example 2) was manufactured using the anode for the lithium ion battery according to Comparative Example 1. Then, after thirty cycles of charging and discharging, the thickness and volume expansion ratio of the composite anode and the anode were measured, and the results are shown in FIGS. 2A to 3B and Table 3 below. Specifically, FIG. 2A is an SEM image showing an anode for a lithium ion battery according to Comparative Example 1 before thirty cycles of charging and discharging together with a thickness thereof, and FIG. 2B is an SEM image showing the anode for the lithium ion battery according to Comparative Example 1 after thirty cycles of charging and discharging together with a thickness thereof. Further, FIG. 3A is an SEM image showing a composite anode for a lithium ion battery according to Example 1 before thirty cycles of charging and discharging together with a thickness thereof, and FIG. 3B is an SEM image showing the lithium ion battery according to Example 1 after thirty cycles of charging and discharging together with a thickness thereof.

TABLE 3

|  | Thickness of composite anode/ anode before charging and discharging (um) | Thickness of composite anode/ anode after charging and discharging (thirty cycles) (um) | Volume expansion ratio of composite anode/anode (%) |
|---|---|---|---|
| Comparative Example 2 | 176 | 291 | 165 |
| Example 2 | 117 | 263 | 225 |

Figure 4:
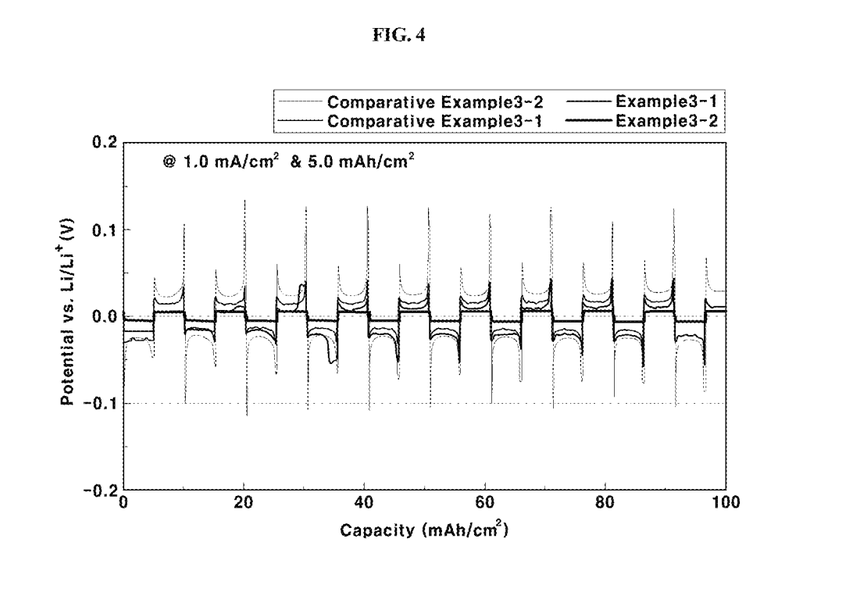
FIG. 4 is a graph showing the results of charging and discharging of symmetric cells according to Examples 3-1 and 3-2 and Comparative Examples 3-1 and 3-2.

As shown in FIGS. 2A to 3B and Tables 2 and 3, with respect to the volume expansion ratio according to the increase of the thickness after charging and discharging, the volume expansion ratios of the anode for the lithium ion battery in the lithium ion battery according to Comparative Example 2 and the composite anode for the lithium ion battery in the lithium ion battery according to Example 2 were about 200%. Accordingly, the volume expansion ratio showed a value of about half of 400% which is the general volume expansion ratio of the lithium anode used as a conventional anode. Further, symmetric cells were manufactured according to Examples 3-1 and 3-2 and Comparative Examples 3-1 and 3-2, and the results after charging and discharging the cells are shown in graphs. Specifically, FIG. 4 is a graph showing the results of charging and discharging of symmetric cells according to Examples 3-1 and 3-2 and Comparative Examples 3-1 and 3-2. As shown in FIG. 4, an overvoltage difference was lower in the symmetric cells according to Examples 3-1 and 3-2 than in the symmetric cells according to Comparative Examples 3-1 and 3-2.

That is, the composite anode for the lithium ion battery manufactured according to the exemplary embodiment of the present invention showed a volume expansion ratio value of about half of a conventional volume expansion ratio even after charging and discharging and also showed the lower overvoltage difference. Accordingly, the composite anode for the lithium ion battery manufactured according to the exemplary embodiments of the present invention has a merit of improving electrodeposition density and reversibility of lithium ions.

Meanwhile, with respect to the symmetric cells according to Examples 3-1 and 3-2 in which the surfaces coming into contact with the electrolyte membrane of the composite anode for the lithium ion battery are different from each other, the overvoltage difference is lower in the symmetric cell according to Example 3-1 in which the impregnation layer in the composite anode for the lithium ion battery is located so as to come into contact with the electrolyte membrane. Accordingly, in the case of the composite anode for the lithium ion battery according to the exemplary embodiment of to the present invention, when a lithium ion battery is manufactured by locating the impregnation layer in the composite anode for the lithium ion battery so as to come into contact with the electrolyte membrane, the electrodeposition density and reversibility of lithium ions are further improved.

Experimental Example 3: Analysis of Battery Characteristics of the Lithium Ion Battery Manufactured Using a Composite Anode for a Lithium Ion Battery The battery characteristics of the composite anode for the lithium ion battery in the lithium ion battery according to Example 2 were analyzed, and the results are shown in FIGS. 5 and 6.

Figure 5:
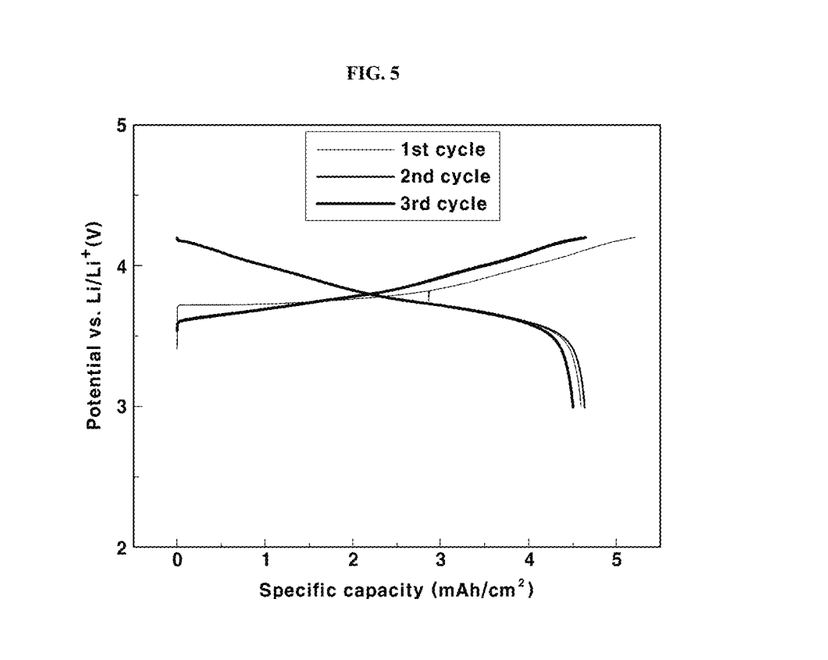
FIG. 5 is a graph showing the result of a pre-cycling test of an exemplary composite anode for a lithium ion battery in a lithium ion battery according to Example 2.

Specifically, FIG. 5 is a graph showing the result of a pre-cycling test of a composite anode for a lithium ion battery in the lithium ion battery according to Example 2. Further, FIG. 6 is a graph showing the result and efficiency of a high current & high capacity cycle test of a composite anode for a lithium ion battery in the lithium ion battery according to Example 2.

Figure 6:
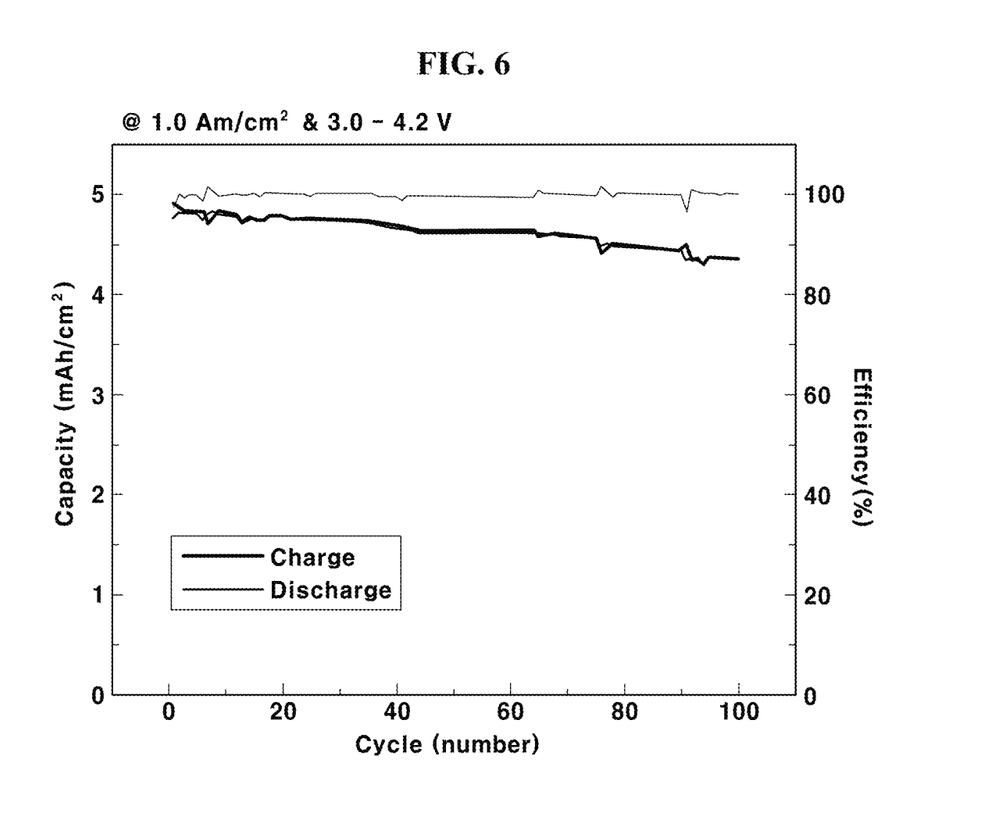
FIG. 6 is a graph showing the result and efficiency of a high current and high capacity cycle test of an exemplary composite anode for a lithium ion battery in the lithium ion battery according to Example 2.

As shown in FIGS. 5 and 6, the lithium ion battery according to Example 2 had high battery efficiency even in the pre-cycling test and the high current & high capacity cycle test of a composite anode for a lithium ion battery therein.

That is, in the method of manufacturing the composite anode for the lithium ion battery according to the exemplary embodiment of the present invention, since it is possible to manufacture a composite anode for a lithium ion battery with the improved lithium electrodeposition density and reversibility of lithium ions, a composite anode for a lithium ion battery having high capacity and improved life stability is obtained.

What is claimed is:

1. A method of manufacturing a composite anode for a lithium ion battery, comprising:
    first heat treating a carbon-supplying layer so that a surface of the carbon-supplying layer is modified to obtain a carbon-modified layer;
    adding a metal catalyst precursor solution to the carbon-modified layer;
    second heating the carbon-modified layer to which the metal catalyst precursor solution is added, to obtain a carbon-metal catalyst composite layer; and
    impregnating lithium metal on one surface of the carbon-metal catalyst composite layer to form an impregnation layer having a predetermined thickness.

2. The method of claim 1, wherein the carbon-supplying layer comprises carbon paper, carbon cloth, carbon felt, and mixture thereof.

3. The method of claim 1, wherein the first heat treating is performed at a temperature of about 400 to 500° C. for about 4 to 6 hours.

4. The method of claim 1, wherein the metal catalyst precursor solution comprises one or more selected from the group consisting of silver nitrate ($AgNO_3$), platinum chloride ($PtCl_2$), iron chloride ($FeCl_3$), palladium chloride ($PdCl_2$), ruthenium chloride ($RuCl_2$), nickel chloride ($NiCl_2$), and copper chloride ($CuCl_2$).

5. The method of claim 1, wherein the second heating is performed on the carbon-modified layer to which the metal catalyst precursor solution is added in an inert gas atmosphere at a current of about 25 A to 35 A for about 1 to 5 seconds.

6. The method of claim 1, wherein the carbon-metal catalyst composite layer comprises an amount of about 85 to 95 wt % of the carbon-modified layer and an amount of about 5 to 15 wt % of a metal catalyst based on 100 wt % of the carbon-metal catalyst composite layer.

7. The method of claim 1, wherein the impregnation layer has a thickness of about 100 to 200 um.

\* \* \* \* \*